(12) United States Patent
Lee (10) Patent No.: US 8,892,935 B2
(45) Date of Patent: Nov. 18, 2014

(54) DYNAMIC BUS CLOCK RATE ADJUSTING METHOD AND DEVICE

(75) Inventor: Shi-Rui Lee, New Taipei (TW)

(73) Assignee: Wistron Corporation, New Taipei (TW)

( * ) Notice: Subject to any disclaimer, the term of this patent is extended or adjusted under 35 U.S.C. 154(b) by 199 days.

(21) Appl. No.: 13/448,934

(22) Filed: Apr. 17, 2012

(65) Prior Publication Data

US 2012/0272088 A1 Oct. 25, 2012

(30) Foreign Application Priority Data

Apr. 22, 2011 (TW) .............................. 100114054 A (51) Int. Cl.
*G06F 1/00* (2006.01)
*G06F 13/00* (2006.01)
*G06F 13/42* (2006.01)
*G06F 1/32* (2006.01)

(52) U.S. Cl.
CPC .............. *G06F 1/3253* (2013.01); *G06F 1/324* (2013.01); *Y02B 60/1235* (2013.01)
USPC ............ 713/501; 710/104; 710/105; 713/500

(58) Field of Classification Search
USPC .................. 713/501, 500, 1, 2, 100, 300–340, 713/400–401, 502–503, 600–601; 710/100, 710/104–125, 305–317; 326/96; 327/152
See application file for complete search history.

(56) References Cited

U.S. PATENT DOCUMENTS

| | | | | |
|---|---|---|---|---|
| 5,212,796 A * | 5/1993 | Allison | ........................ | 710/264 |
| 6,233,635 B1 * | 5/2001 | Son | ............................ | 710/315 |
| 6,560,240 B1 * | 5/2003 | Borland et al. | ............... | 370/444 |
| 7,007,121 B1 * | 2/2006 | Ansari et al. | .................. | 710/113 |
| 2003/0237012 A1 | 12/2003 | Jahagidar et al. | | |
| 2005/0055592 A1 * | 3/2005 | Velasco et al. | ................ | 713/322 |
| 2005/0172059 A1 * | 8/2005 | Yoshimura et al. | ........... | 710/110 |
| 2007/0143512 A1 * | 6/2007 | Kuo | .............................. | 710/110 |
| 2008/0091861 A1 * | 4/2008 | Jones | ............................ | 710/106 |
| 2009/0249089 A1 * | 10/2009 | Tremel et al. | ................. | 713/300 |
| 2010/0325326 A1 * | 12/2010 | Huang et al. | .................. | 710/110 |

FOREIGN PATENT DOCUMENTS

CN 1637256 A 7/2005

OTHER PUBLICATIONS

Official Office Action issued on Mar. 5, 2014 in corresponding Taiwan Patent Application No. 100114054.
The Office Action of Chinese Counterpart Patent Application No. 201110133307.5, issued on Jun. 19, 2014 and an English translation of passage(s) boxed in red.

* cited by examiner

*Primary Examiner* — Mark Connolly
*Assistant Examiner* — Joshua Neveln
(74) *Attorney, Agent, or Firm* — Vedder Price PC (57) ABSTRACT

A dynamic bus clock rate adjusting method is to be executed by a bus controller and a CPU. The bus controller is coupled with a bus that is coupled with a plurality of slave devices. The method comprises the steps of: configuring the bus controller to generate, upon receipt of a request signal from one of the slave devices, an access instruction including an address from which the request signal is sent; and configuring the CPU to determine which of the slave devices the address of the access instruction corresponds so as to obtain a working clock rate thereof, and to set the bus controller to adjust an operating clock rate of the bus according to the working clock rate, and to perform the access instruction on the slave device via the bus.

14 Claims, 9 Drawing Sheets

DYNAMIC BUS CLOCK RATE ADJUSTING METHOD AND DEVICE

CROSS-REFERENCE TO RELATED APPLICATION

This application claims priority of Taiwanese Patent Application No. 100114054, filed on Apr. 22, 2011, and the disclosure of which is incorporated herein by reference.

BACKGROUND OF THE INVENTION

1. Field of the Invention

The present invention relates to a bus clock rate adjusting method, more particularly to a dynamic bus clock rate adjusting method for dynamically adjusting an operating clock rate of a bus according to a working clock rate of a slave device to be accessed.

2. Description of the Related Art

Figure 1:
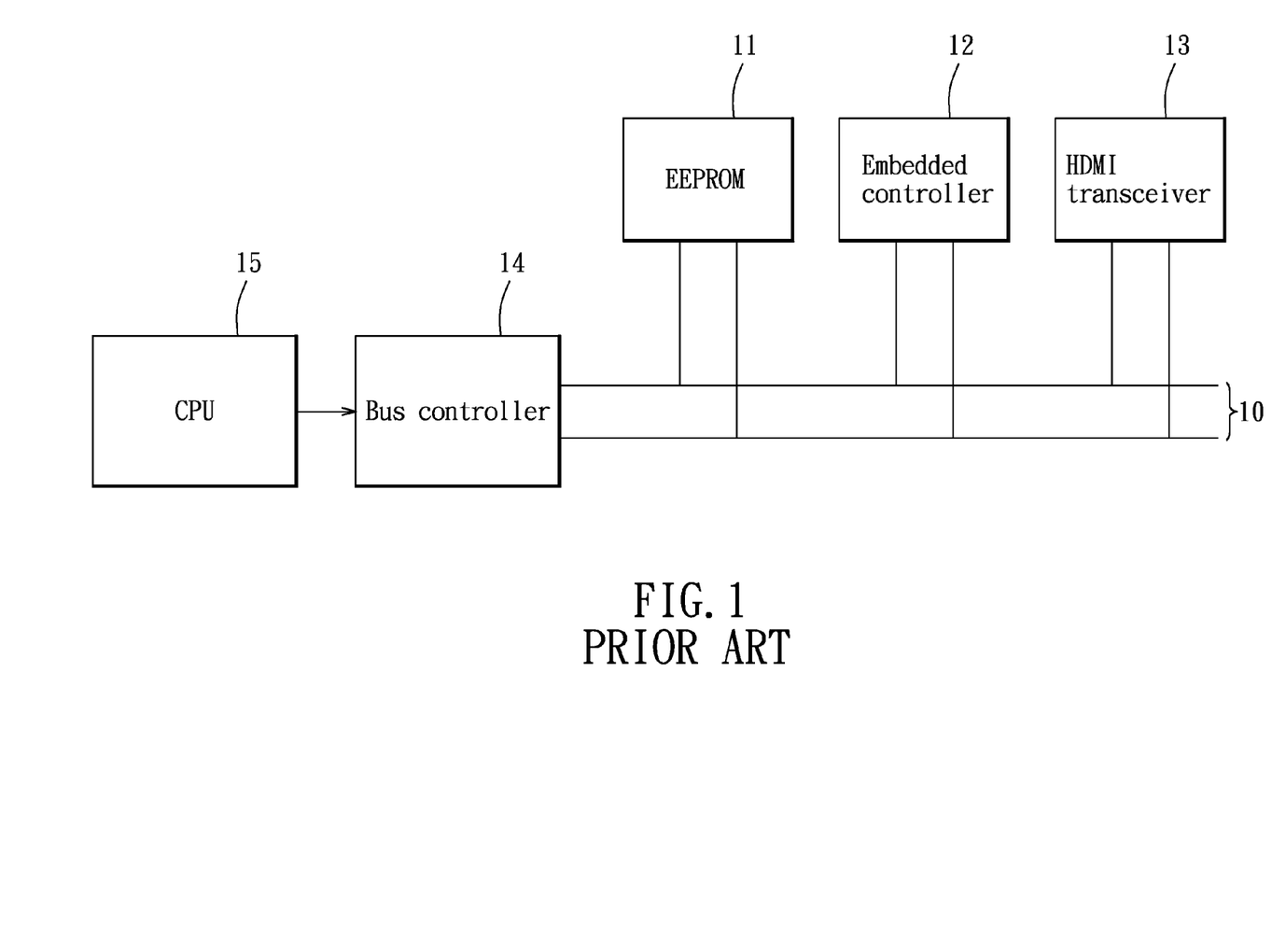
FIG. 1 is a block diagram illustrating a conventional System Management Bus (SMBus), an SMBus controller, and slave devices electrically coupled to the SMBus.

Referring to FIG. 1, a bus 10 of a computer system, such as a System Management Bus (SMBus) or an Inter-Integrated Circuit ($I^2C$) bus, is provided to be electrically coupled with a plurality of slave devices, such as an Electrically Erasable Programmable Read-Only Memory (EEPROM) 11, an embedded controller (or a keyboard controller) 12, and a High Definition Multimedia Interface (HDMI) transceiver 13. Moreover, a bus controller 14, such as a SMBus controller or an $I^2C$ bus controller, is coupled electrically to the bus 10, so as to decide an operating clock rate of the bus 10 and to access or perform setting operations on the slave devices 12, 13 and 14 via the bus 10.

Owing to the characteristics of the SMBus and the $I^2C$ bus, a device which operates at a lower working clock rate, such as the embedded controller (or the keyboard controller) 12 with a working clock rate ranging from 10 KHz to 100 KHz, is incapable of working on a bus with a higher operating clock rate. While a device which operates at a higher working clock rate, such as the HDMI transceiver 13 with a highest working clock rate of 400 KHz, is capable of working on a bus with a lower operating clock rate. Based on the aforementioned limitations, conventionally, a central processing unit (CPU) 15 is configured to set the bus controller 14 such that the operating clock rate of the bus 10 is set to a working clock rate at which the slowest slave device operates, such as the highest working clock rate at which the embedded controller (or the keyboard controller) 12 operates, i.e., 100 KHz.

Furthermore, since the aforementioned EEPROM 11 is only accessed by the CPU 15 during a booting process, and the HDMI transceiver 13 is only required to transmit a control signal via the bus 10 when an external display device (not shown) is connected thereto, for most of the time, the bus 10 is primarily used for reading of a scan code of a keyboard temporarily stored in the embedded controller (or the keyboard controller) 12. Moreover, it is favorable in terms of power saving for the bus 10 to operate at a lower operating clock rate. Therefore, taking power saving into consideration, the operating clock rate of the bus 10 should be set to the lowest working clock rate of the embedded controller (or the keyboard controller) 12, i.e., 10 KHz.

Nevertheless, in this way, since the EEPROM 11 may not be accessed at a higher clock rate, booting efficiency is limited by the operating clock rate of the bus 10. Moreover, efficiency of the HDMI transceiver 13 when connected with the external display device would also be limited by the operating clock rate of the bus 10, such that the external display device may not display images timely.

SUMMARY OF THE INVENTION

Therefore, an object of the present invention is to provide a dynamic bus clock rate adjusting method and device capable of effectively promoting system performance while also save power.

Accordingly, the dynamic bus clock rate adjusting method, according to the present invention, is to be executed by a bus controller and a central processing unit (CPU) that are electrically coupled together. The bus controller is further coupled electrically with a bus that is coupled electrically with a plurality of slave devices, and is able to control an operating clock rate of the bus. The method comprises the steps of:

configuring the bus controller to generate, upon receipt of a request signal from one of the slave devices and according to the request signal, an access instruction including an address from which the request signal is sent; and configuring the CPU to determine, according to the access instruction, which of the slave devices the address of the access instruction corresponds so as to obtain a working clock rate thereof, and to set the bus controller according to the working clock rate thus obtained for the bus controller to adjust the operating clock rate of the bus according to the working clock rate, and to perform the access instruction on the slave device thus determined via the bus.

Furthermore, the dynamic bus clock rate adjusting device, according to the present invention, comprises a bus controller and a central processing unit (CPU) that are electrically coupled together.

The bus controller is to be further coupled electrically with a bus that is coupled electrically with a plurality of slave devices, and is able to control an operating clock rate of the bus. The bus controller is configured to generate, upon receipt of a request signal from one of the slave devices and according to the request signal, an access instruction including an address from which the request signal is sent. The CPU is configured to determine, according to the access instruction, which of the slave devices the address of the access instruction corresponds so as to obtain a working clock rate thereof, and to set the bus controller according to the working clock rate thus obtained for the bus controller to adjust the operating clock rate of the bus according to the working clock rate, and to perform the access instruction on the slave device thus determined via the bus.

Preferably, the working clock rate is a highest working clock rate of the slave device thus determined, and the bus controller is set to adjust the operating clock rate of the bus to be equal to the working clock rate.

Preferably, the bus is one of: a System Management Bus (SMBus), where the bus controller is an SMBus controller; an Inter-Integrated Circuit ($I^2C$) bus, where the bus controller is an $I^2C$ bus controller; and a Serial Peripheral Interface (SPI) bus, where the bus controller is an SPI bus controller.

Preferably, the request signal is an interrupt signal.

Preferably, the CPU is configured to determine which of the slave devices the address of the access instruction corresponds, to obtain the working clock rate of the slave device, and to set the bus controller according to the working clock rate thus obtained by means of executing a device driver associated with the bus controller.

Preferably, the device of the present invention further comprises a bus selector unit coupled electrically with the bus controller. The bus selector unit has an input terminal that is to be coupled electrically to the bus, and at least two output terminals that are to be coupled electrically and respectively to two other buses. Each of the two other buses is coupled electrically with at least one slave device capable of transmitting a request signal to the bus controller through the bus selector unit. The bus selector unit is operable to selectively establish electrical connection between the input terminal and one of the at least two output terminals. When it is determined by the CPU that the slave device the address of the access instruction corresponds is one coupled electrically to one of the two other buses, the CPU is configured to set the bus controller such that the bus controller controls the bus selector unit to establish electrical connection between the input terminal and one of the at least two output terminals to which said one of the two other buses is electrically coupled, adjusts the operating clock rate of said one of the two other buses according to the working clock rate obtained by the CPU for the slave device determined from the address, and performs the access instruction on the slave device thus determined via said one of the two other buses.

Effects of the present invention reside in that by means of the CPU obtaining the working clock rate of the slave device the bus controller is to access, and setting the bus controller according to the working clock rate thus obtained for the bus controller to adjust the operating clock rate of the bus, the bus is dynamically adjusted such that a slave device with a lower working clock rate may be accessed at a lower speed to save power, and a slave device with a higher working clock rate may be accessed at a higher speed so as to promote system efficiency.

BRIEF DESCRIPTION OF THE DRAWINGS

Other features and advantages of the present invention will become apparent in the following detailed description of the two embodiments with reference to the accompanying drawings, of which.

DETAILED DESCRIPTION OF THE EMBODIMENTS

Figure 2:
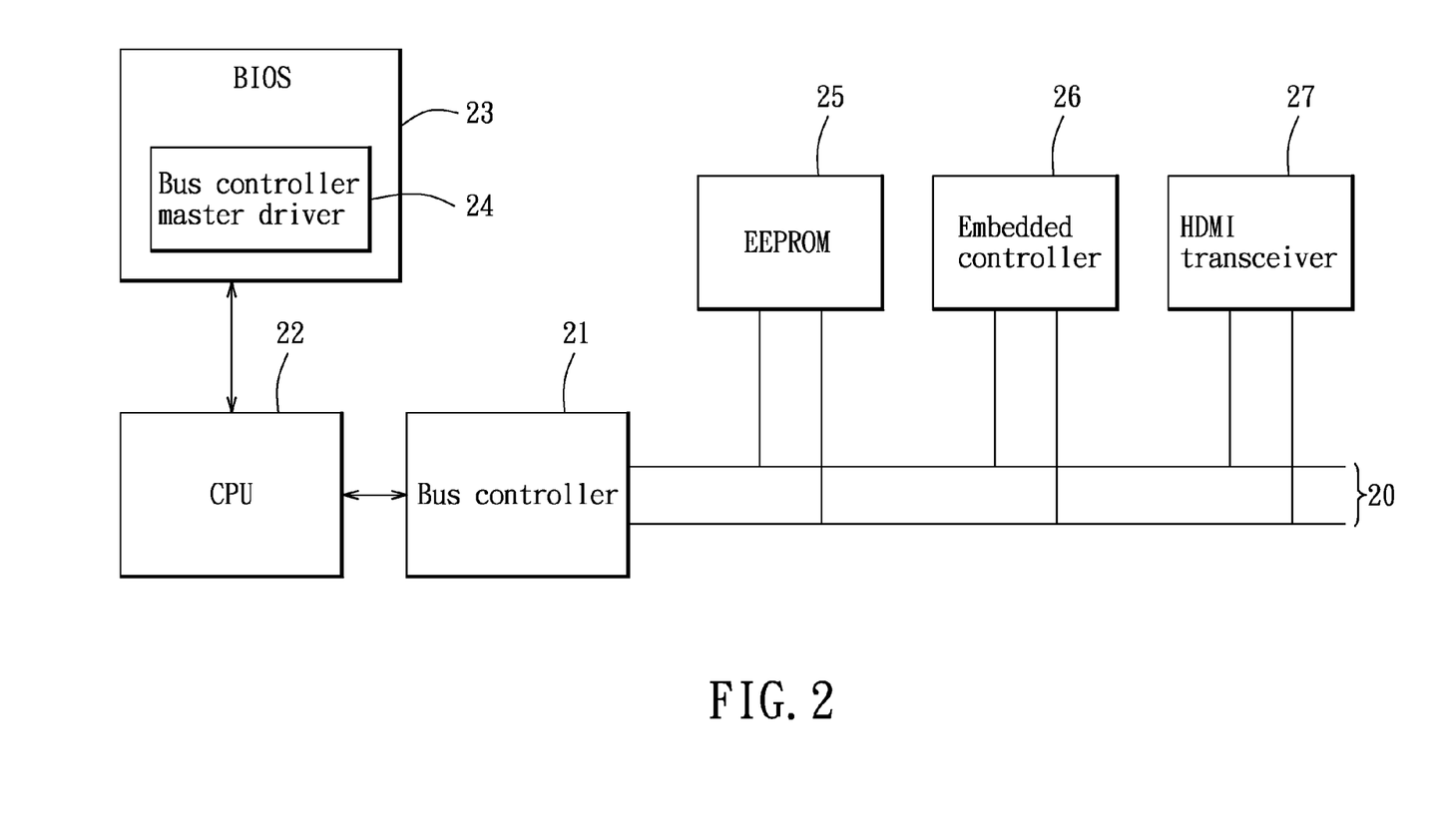
FIG. 2 is a block diagram illustrating architecture of a bus and relevant system components of a dynamic bus clock rate adjusting device according to a first embodiment of the present invention.

Referring to FIG. 2, a dynamic bus clock rate adjusting device according to a first embodiment of the present invention may be applied to a general computer system, such as a personal computer, a notebook computer, a tablet computer, etc. The dynamic bus clock rate adjusting device comprises a bus controller 21 and a central processing unit (CPU) 22 that are electrically coupled together, and a bus controller master driver 24 associated with the bus controller 21 and pre-stored in a basic input/output system (BIOS) 23 that is coupled electrically with the CPU 22. The bus controller 21 is to be further coupled electrically with a bus 20. The bus controller 21 is usually integrated with a southbridge chip (not shown), and alternatively integrated with the CPU 22 and a southbridge chip into a system on chip (SoC). The bus 20 may be one of a System Management Bus (SMBus), an Inter-Integrated Circuit (I²C) bus, a Serial Peripheral Interface (SPI) bus, etc. Correspondingly, the bus controller 21 may be one of an SMBus controller, an I²C bus controller, an SPI bus controller, etc. In this embodiment, the SMBus (the bus hereinafter) and the SMBus controller (the bus controller 21 hereinafter) are adopted as examples for explanation.

The bus 20 is coupled electrically with a plurality of slave devices. In this embodiment, three slave devices 25, 26 and 27 are shown for illustration purposes. The slave device 25 may be an Electrically Erasable Programmable Read-Only Memory (EEPROM). The slave device 26 may be one of an embedded controller and a keyboard controller that detects a key signal resulting from operating a keyboard. The slave device 27 may be a High Definition Multimedia Interface (HDMI) transceiver. The bus controller 21 is adapted to control an operating clock rate of the bus 20, and to access or perform setting operations on the slaves devices 25~27 via the bus 20.

Owing to characteristics of the bus 20, a device working at a lower speed, such as the slave device 26 (the embedded controller or the keyboard controller with a highest working clock rate of 100 KHz) is incapable of working on the bus 20 when the bus 20 operates at a higher operating clock rate. However, a device working at a higher speed, such as the slave device 27 (the HDMI transceiver with a highest working clock rate of 400 KHz) is still capable of working on the bus 20 when the bus 20 operates at a lower operating clock rate. Therefore, based on the aforementioned limitations, in order to keep the slave devices 25~27 from being limited by the operating clock rate of the bus 20, the device of the present invention is configured to implement a dynamic bus clock rate adjusting method as shown in FIG. 3.

Figure 3:
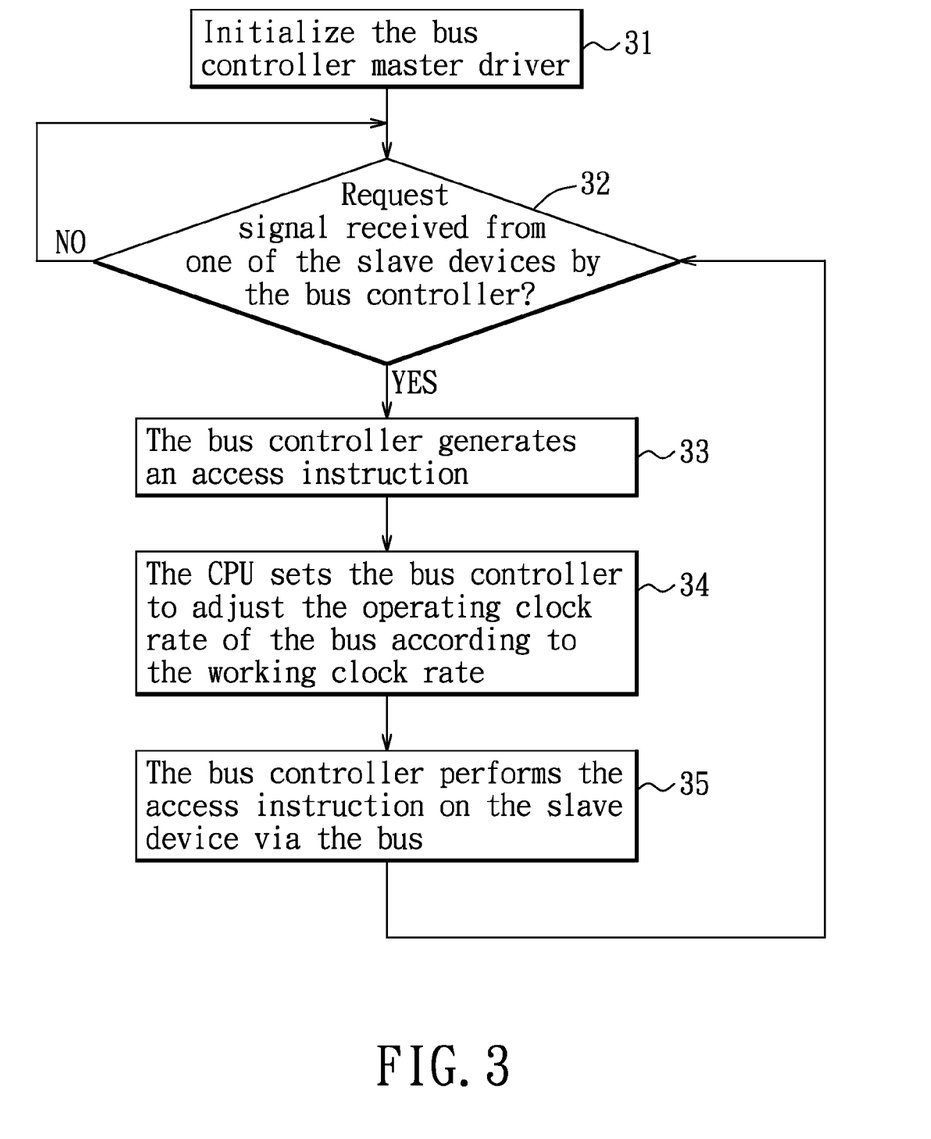
FIG. 3 is a flow chart of a dynamic bus clock rate adjusting method according to the first embodiment of the present invention.
Figure 4:
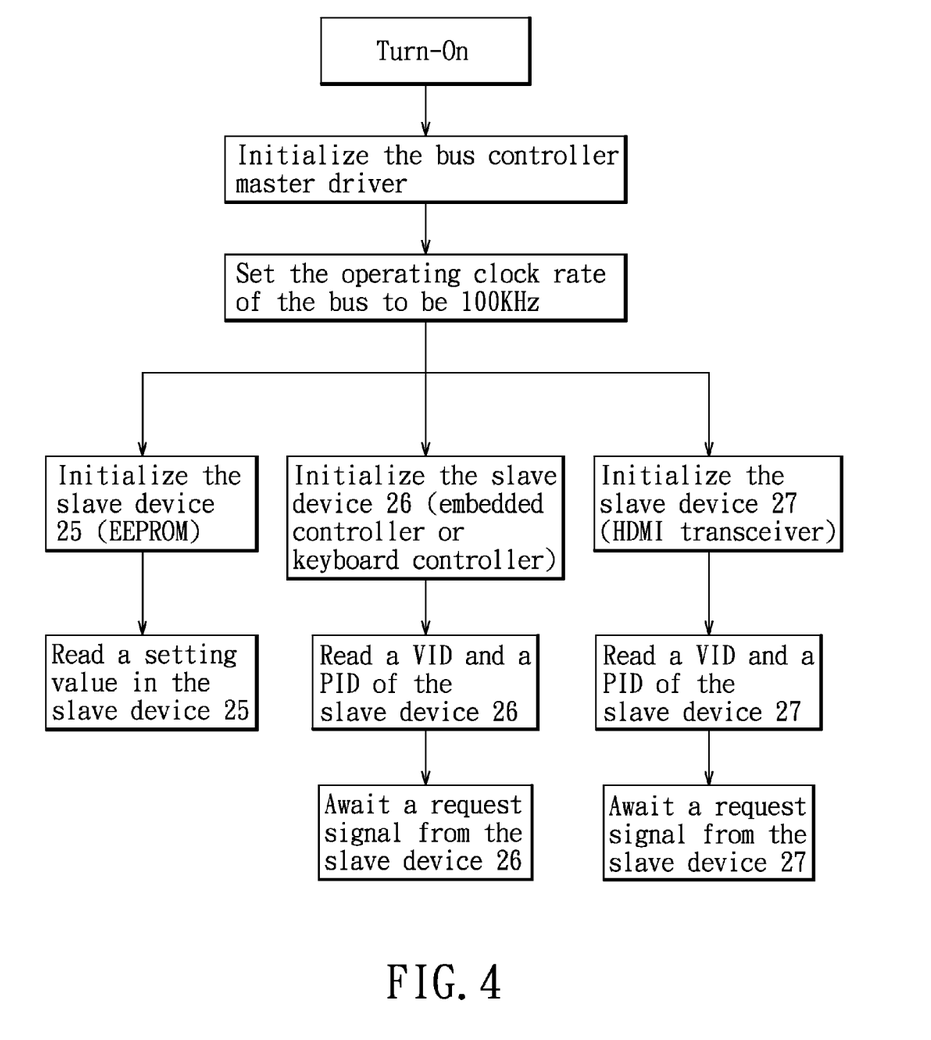
FIG. 4 is a flow chart of a booting process of the first embodiment.

First, when the computer system is turned on and a booting process is to be performed, referring to step 31 in FIG. 3 and booting steps in FIG. 4, the BIOS 23 is configured to initialize the bus controller master driver 24 such that the bus controller 21 is configured to read information related to a working clock rate of each of the slave devices 25, 26 and 27 that is coupled electrically to the bus 20, and to read, via the bus, setting values stored in the slave device 25 (EEPROM) as setting values for volume or sound effect of the computer system. For example, the information related to the working clock rate of the slave device 26 (the embedded controller or the keyboard controller) as read by the bus controller 21 may include a highest working clock rate of 100 KHz and a normal working clock rate of 10 KHz.

At this moment, in order to boost the speed of accessing the slave device 25 so as to promote booting efficiency of the computer system, the bus controller master driver 24 may set, through the bus controller 21, the operating clock rate of the bus 20 to be a highest working clock rate of one of the slave devices 25~27 with the lowest normal working clock rate. In this case, the operating clock rate of the bus 20 is set to the highest working clock rate of 100 KHz of the slave device 26. Subsequently, referring to FIG. 4, the bus controller 21 is further configured to initialize the slave device 25 (EEPROM), to read other setting values in the slave device 25 (EEPROM), to initialize the slave device 26 (the embedded controller or the keyboard controller), to read a vender ID (VID) and a product ID (PID) of the slave device 26, to set up the slave device 26, to initialize the slave device 27 (the HDMI transceiver), to read a VID and a PID of the slave device 27, and to set up the slave device 27. After the aforementioned steps are performed, the booting process ends, and the bus controller 21 awaits a request signal from the slave devices 26 and 27.

Figure 5:
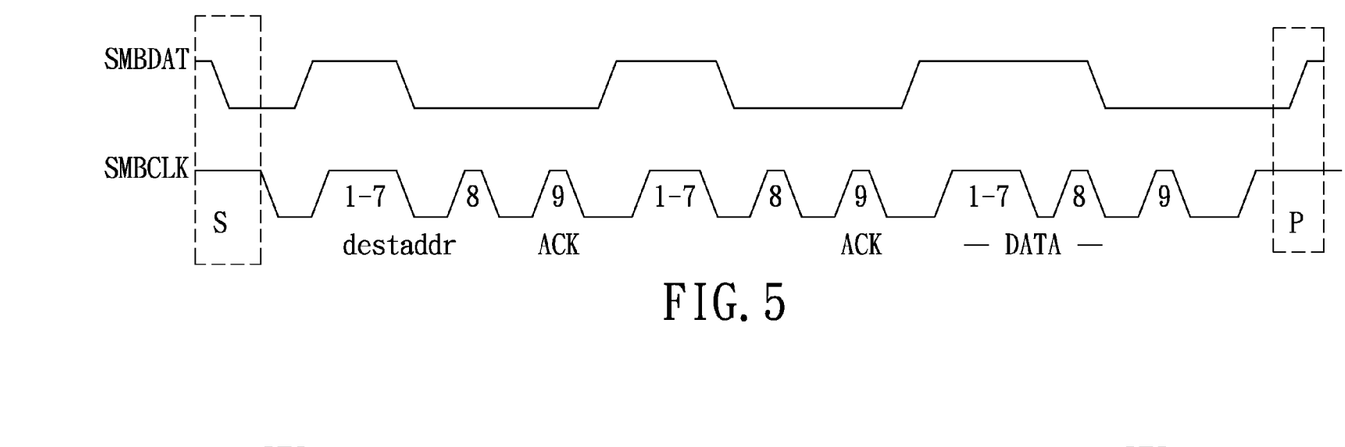
FIG. 5 is a schematic diagram illustrating a data format of an access instruction generated by an SMBus controller.

Referring FIG. 3, upon receipt of the request signal from one of the slave devices 26, 27 in step 32, the bus controller 21 is configured to generate, according to the request signal, an access instruction in step 33. For example, the slave device 26, upon receipt of an event resulting from pressing a key of a keyboard coupled thereto, sends an interrupt signal (i.e., the request signal) to the bus controller 21 for demanding the bus controller 21 to read a scan code generated by the slave device 26 in response to the pressing of the key, and the access instruction generated by the bus controller 21 is directed to the demand to read the scan code. It is noted from a data format of the access instruction in FIG. 5 that the access instruction includes an address (destaddr) from which the request signal is sent, i.e., the address of the slave device 26 in the example. Although the operating clock rate of the bus 20 at this moment is set to be the highest working clock rate of 100 KHz of the slave device 26, and the bus controller 21 is able to perform the access instruction for reading the scan code of the key from the slave device 26 at this operating clock rate, taking into consideration a speed the keys of the keyboard are pressed, it would be sufficient for the operating clock rate of the bus 20 to be 10 KHz.

Therefore, for implementing the aforementioned idea, this embodiment is featured in that, in step 34, the CPU 22 is configured to, by means of executing the bus controller master driver 24 before the bus controller 21 performs the access instruction, determine which of the slave devices 25, 26 and 27 the address of the access instruction corresponds so as to obtain the normal working clock rate thereof, i.e., 10 KHz for the slave device 26 in this example, and to set the bus controller 21 according to the working clock rate thus obtained for the bus controller 21 to adjust the operating clock rate of the bus 20 to correspond thereto. Subsequently, in step 35, the bus controller 21 is configured to perform the access instruction on the slave device 26 via the bus 20. In this way, the bus controller 21 may access the slave device 26 at a relatively lower clock rate so as to save power.

After the aforementioned access instruction is performed, the flow goes back to step 32, where the bus controller 21 awaits the request signal. When a request signal from the slave device 27 is received by the bus controller 21, the flow goes to step 33. For example, when an external display device is connected to the slave device 27 (HDMI transceiver) and a plug-in signal is generated correspondingly, the slave device 27 sends an interrupt signal to the bus controller 21 for demanding the bus controller 21 to read setting values, such as extended display identification data (EDID) and supported resolution data, of the external display device.

Similarly, in step 33, the bus controller 21 is configured to generate an access instruction including an address from which the request signal is sent, i.e., the address of the slave device 27. Since transmission of massive image data via the bus 20 is expected after the slave device 27 is connected with the external display device, the faster the bus 20 operates, the more transmission time is saved to allow for faster response in terms of image display by the external display device. However, the operating clock rate of the bus 20, as previously set in accordance with the slave device 26, to be 10 KHz is apparently too slow for transmission of the image data. Therefore, prior to performing the access instruction, in step 34, the CPU 22 is configured to execute the bus controller master driver 24, to determine that it is the slave device 27 that the address of the access instruction corresponds so as to obtain the working clock rate of 400 KHz thereof, and to set the bus controller 21 according to the working clock rate thus obtained for the bus controller 21 to adjust the operating clock rate of the bus 20 to be 400 KHz. Subsequently, in step 35, the bus controller 21 is configured to perform the access instruction on the slave device 27 via the bus 20. In this way, during a period when the bus controller is accessing the slave device 27, operating efficiency of the slave device 27 may be brought into full play such that the external display device may achieve an optimized display mode as supported by the slave device 27.

Figure 6:
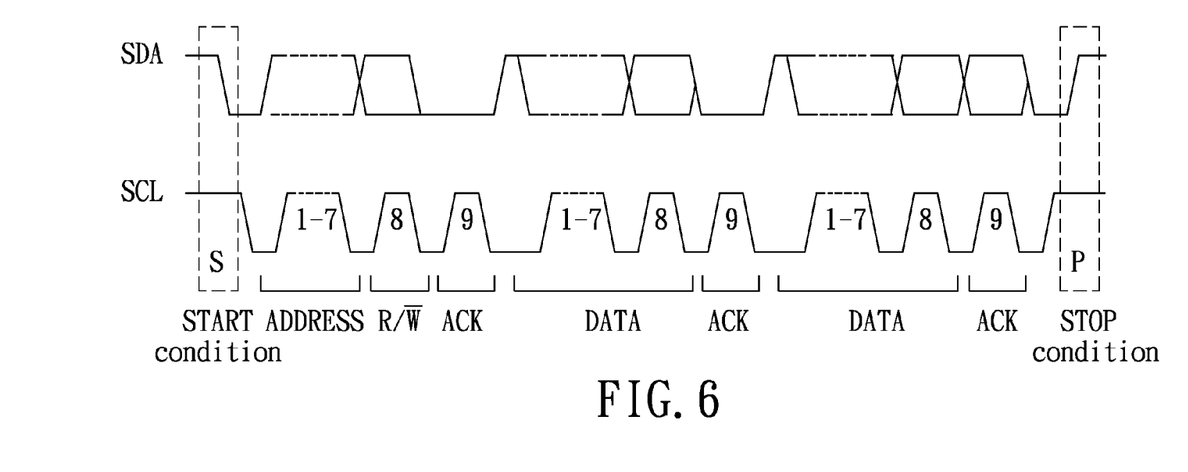
FIG. 6 is a schematic diagram illustrating a data format of an access instruction generated by an I²C bus controller.

Referring to FIG. 6, it is noted from a data format of the access instruction of an $I^2C$ bus that the access instruction includes an address (ADDRESS) from which the request signal is sent, i.e., the address of the slave device the bus controller 21 (the $I^2C$ bus controller) is to access. Therefore, the CPU 22 may set, with reference to the address of the access instruction, the bus controller 21 to adjust correspondingly the operating clock rate of the bus 20 in accordance with the working clock rate obtained for the slave device which sends the request signal, so as to achieve the effect of dynamically adjusting the operating clock rate of the bus 20 for timely saving power or promoting operating efficiency of the computer system.

Figure 7:
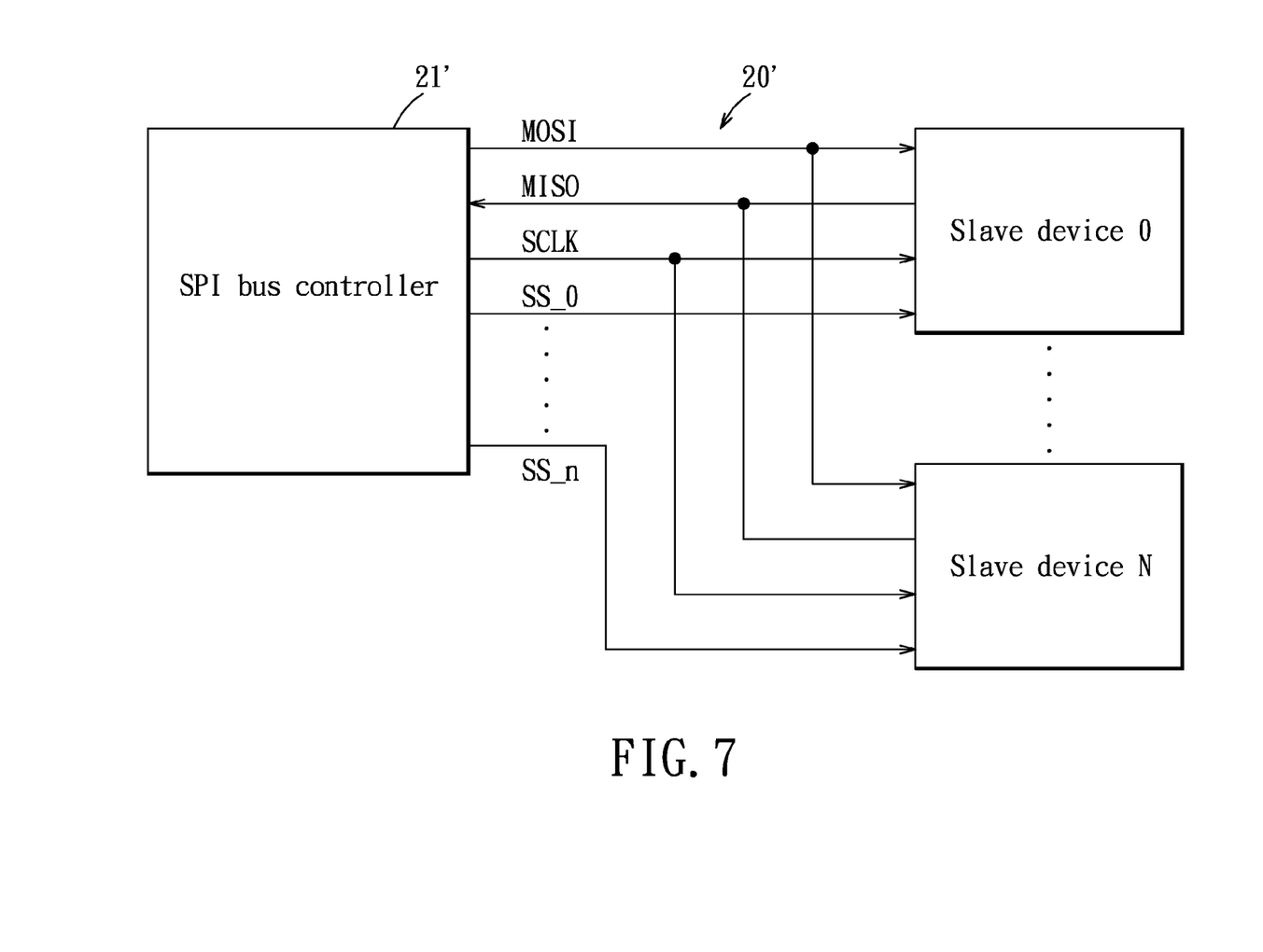
FIG. 7 is a bock diagram illustrating an SPI bus controller coupled electrically with a plurality of slave devices via a SPI bus.

The bus 20 of this embodiment may also be an SPI bus 20' as illustrated in FIG. 7. The SPI bus controller 21' is different from the aforementioned SMBus controller and the $I^2C$ bus controller in that the SPI bus controller 21' is coupled electrically to each of the slave devices 0~N which are electrically coupled to the bus 20' via a respective one of slave select lines ss_0~ss_n. Upon receipt of a request signal from one of the slave devices 0~N, such as the slave device 0, the SPI bus controller 21' is configured to pull low the corresponding slave selector line ss_0, and to generate an access instruction including an address from which the request signal is sent, i.e., the address of the slave device 0. Therefore, in the same manner as described above, the CPU 22 may set, with reference to the access instruction, the SPI bus controller 21' to adjust correspondingly the operating clock rate of the bus 20' in accordance with the working clock rate of the slave device 0 which sends the request signal, so as to achieve the effect of dynamically adjusting the operating clock rate of the SPI bus 20' for timely saving power or promoting operating efficiency of the computer system.

Furthermore, since the SMBus is defined to have a lowest operating clock rate of 10 KHz while the $I^2C$ bus standard does not define a lowest operating clock rate, when the $I^2C$ bus is adopted and a more power-saving condition is desired, the bus controller master driver 24 may be configured to determine whether a waiting time (i.e., the interval during which the request signal is not received) of the bus controller 21 reaches a predetermined threshold. When the bus controller master driver 24 determines that the waiting time reaches the predetermined threshold, the bus controller 21 is configured to stop generating an operating clock signal, that is to adjust the operating clock rate of the bus 20 to be 0 KHz, and to only generate the operating clock signal when a request signal is subsequently received in accordance with the working clock rate of the slave device which sends the request signal.

Figure 8:
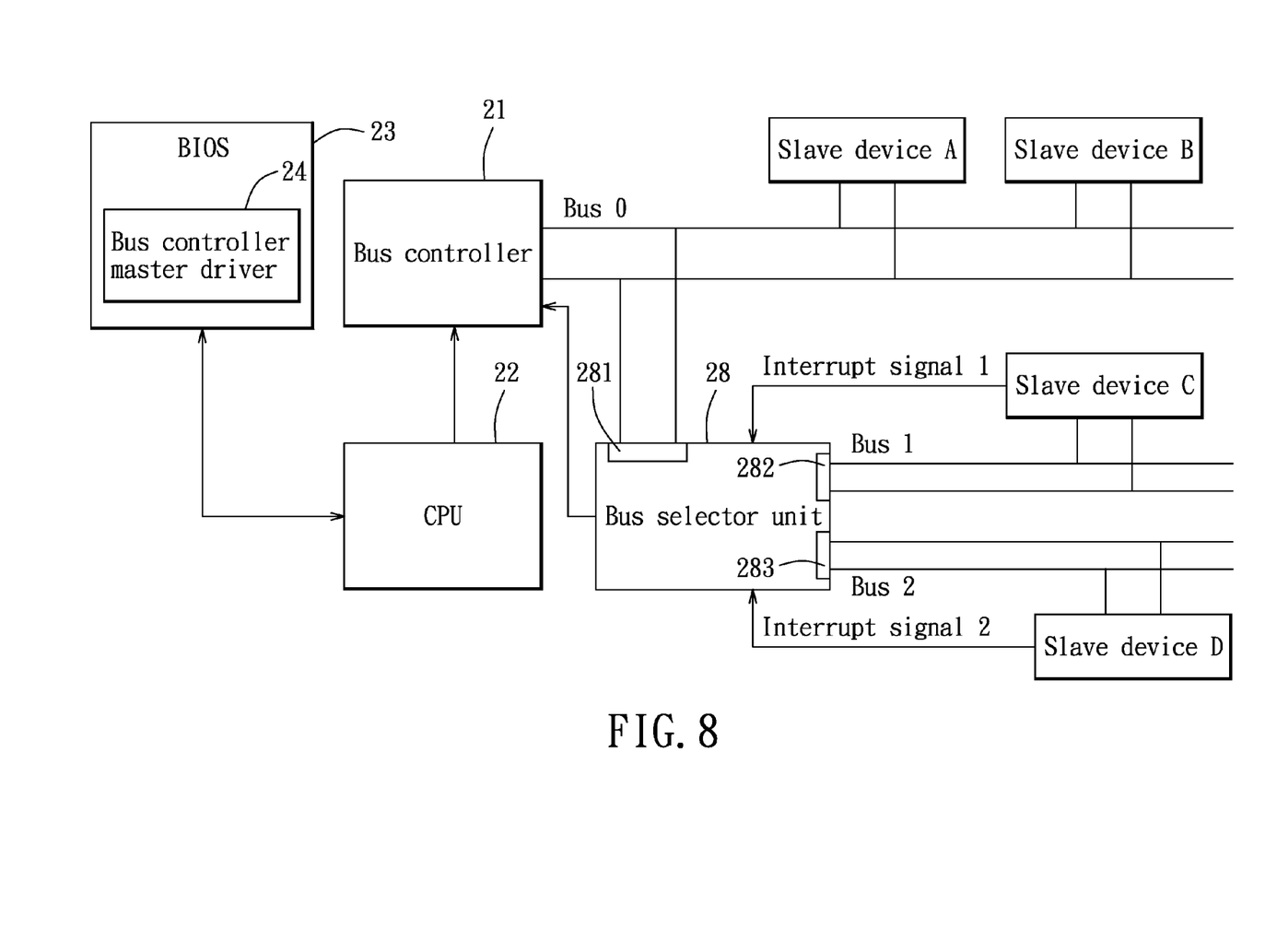
FIG. 8 is a block diagram illustrating architecture of a bus and relevant system components of the dynamic bus clock rate adjusting device according to a second embodiment of the present invention.

Referring to FIG. 8, the dynamic bus clock rate adjusting device, according to a second embodiment of the present invention differs from the first embodiment in that the second embodiment further comprises a bus selector unit 28 that is coupled electrically with and controllable by the bus controller 21. The bus selector unit 28 has an input terminal 281 that is to be coupled electrically to a bus 0, and at least two output terminals 282 and 283 that are to be coupled electrically and respectively to two other buses 1 and 2. Each of the buses 0, 1 and 2 is coupled electrically with at least one slave device. In a preferred approach, the slave devices with substantially the same or similar working clock rates are coupled electrically to an identical bus. For example, the bus 0 is coupled electrically with the slave devices A and B which have relatively higher or substantially the same working clock rates, the buses 1 and 2 are coupled electrically and respectively with the salve devices C and D with different and relatively lower working clock rates than those of the slave devices A and B.

Figure 9:
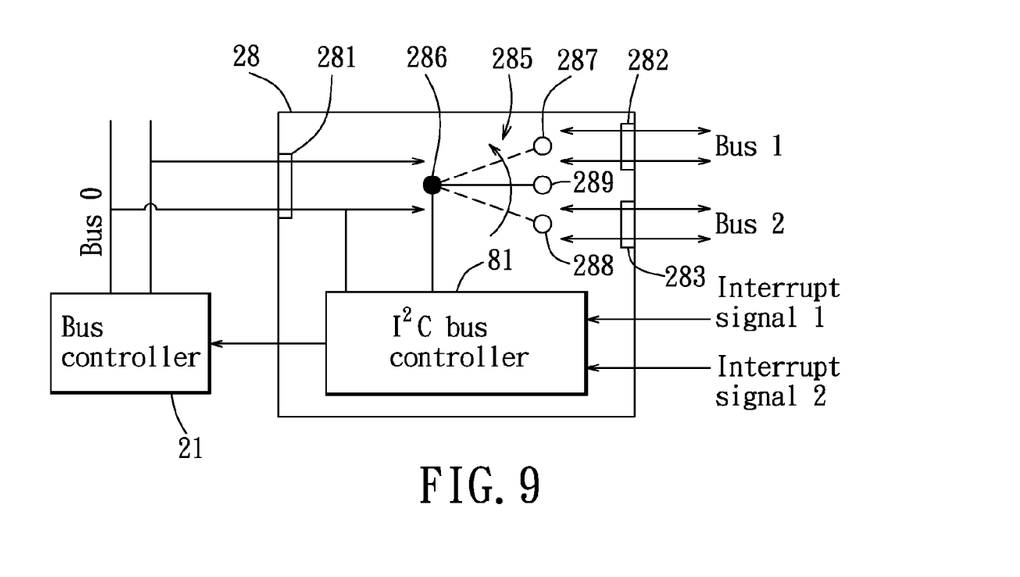
FIG. 9 is a schematic circuit diagram of a bus selector unit which is implemented by a multiplexer according to the second embodiment.

Referring to FIG. 9, the bus selector unit 28 may be a multiplexer (e.g., PCA954X) which includes an I²C controller 81, a selector 285, the input terminal 281, and output terminals 282 and 283. The I²C controller 281 is coupled electrically to the bus controller 21 for transmitting the request signal (i.e., an interrupt signal 1 from the slave device C or an interrupt signal 2 from the slave device D) to the bus controller 21. The selector 285 has an input junction 286 that is coupled electrically to the input terminal 281, and three output junctions 287~289. The output junctions 287 and 288 are coupled electrically and respectively to the output terminals 282 and 283, and the output junction 289 is idle. The I²C controller 81 controls the selector 285, based on command of the bus controller 21, to select one of the output junctions 287~289 so as to selectively establish electrical connection between the bus 0 and the bus 1, establish electrical connection between the bus 0 and the bus 2, or not establish electrical connection between the bus 0 and any of the buses 1 and 2.

Figure 10:
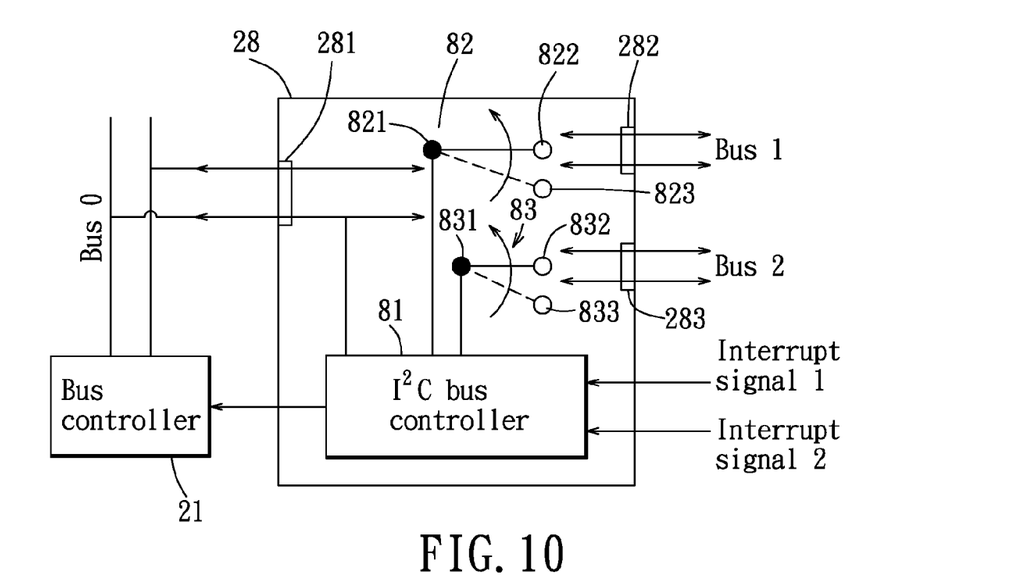
FIG. 10 is a schematic circuit diagram of the bus selector unit which is implemented by a change-over switch according to the second embodiment.

Alternatively, the bus selector unit 28 may also adopt a change-over switch illustrated in FIG. 10. The change-over switch includes an I²C controller 81, and two switches 82 and 83. The I²C controller 81 is coupled electrically to the bus controller 21 for transmitting the request signal (i.e., an interrupt signal 1 from the slave device C or an interrupt signal 2 from the slave device D) to the bus controller 21. Each of the switches 82 and 83 has an input node 821, 831, and two output nodes 822 and 823, 832 and 833. The input node 821 of the switch 82 is coupled electrically to the bus 0, the output node 822 is coupled to the bus 1, and the output node 823 is idle. The I²C controller 81 may control whether the input node 821 is to be electrically coupled to the output node 822 or the output node 823. The input node 831 of the switch 83 is coupled electrically to the bus 0, the output node 832 is coupled to the bus 2, and the output node 833 is idle. The I²C controller 81 may control whether the input node 831 is to be electrically coupled to the output node 832 or the output node 833. Therefore, the I²C controller 81 may control the switches 82 and 83, as commanded by the bus controller 21, to selectively establish electrical connection between the bus 0 and the bus 1, establish electrical connection between the bus 0 and the bus 2, or not establish electrical connection between the bus 0 and any of the buses 1 and 2.

Figure 11:
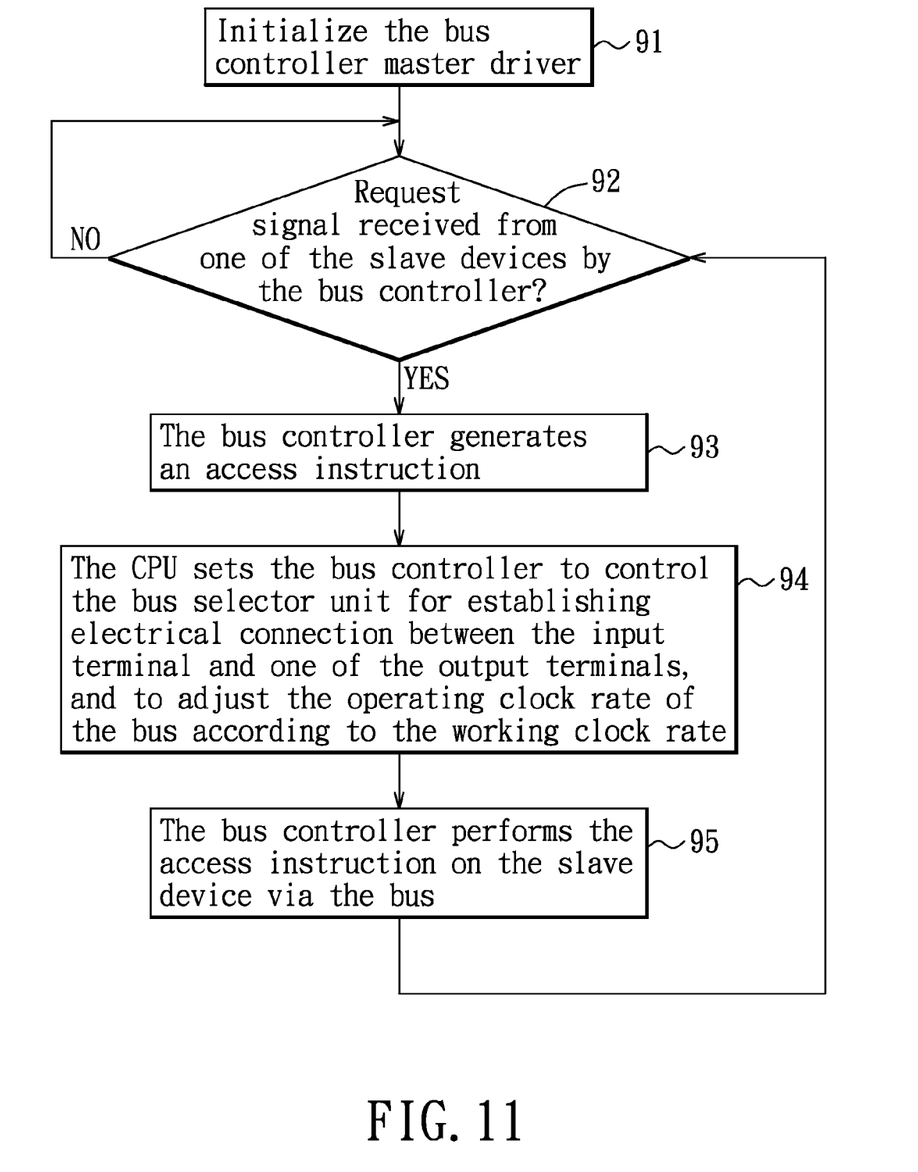
FIG. 11 is a flow chart of the dynamic bus clock rate adjusting method according to the second embodiment of the present invention.

Referring back to FIG. 8 in combination with FIG. 11, in this way, in step 91, after the booting process of the computer system ends, the flow proceeds to step 92 (similar to step 32 in FIG. 3). The bus controller 21 is configured to wait for the request signal from one of the slave devices A, B, C and D. Upon receipt of the request signal from one of the slave devices A, B, C and D, such as the slave device C, in step 93 (similar to step 33 in FIG. 3), the bus controller 21 is configured to generate the access instruction corresponding to the slave device C. Subsequently, in step 94, the CPU 22 is configured to determine which slave device the access instruction corresponds, obtain the working clock rate thereof, and set the bus controller 21 to control the bus selector unit 28 to establish electrical connection between the input terminal 281 and one of the output terminals 282, 283 to which the bus coupled to the slave device thus determined is electrically coupled, i.e., to select the bus 1 to which the slave device C is electrically coupled, adjusts the operating clock rate of the bus (bus 1) to be equal to the working clock rate (or the highest working clock rate) obtained by the CPU 22, and to perform the access instruction on the slave device (the slave device C) via the bus (bus 1). At this time, the operating clock rate of the bus 0 is set to be substantially the same with that of the bus 1, while the bus 2 is separated from the bus 1 and has a 0KHz operating clock rate.

In the same manner, when the slave device D sends the request signal to the bus controller 21 via the bus selector unit 28, the bus controller 21 generates a corresponding access instruction for the CPU to determine that it is the slave device D that sends the request signal and to obtain the working clock rate of the slave device D. The CPU 22 then sets the bus controller 21 to control the bus selector unit 28 to establish electrical connection between the input terminal 281 and the output terminal 283 to which the bus 2 coupled electrically to the slave device D is electrically coupled, to adjust the operating clock rate of the bus 2 according to the working clock rate of the slave device D, and to perform the access instruction on the slave device D via the bus 2. At this time, the operating clock rate of the bus 0 is set to be substantially the same with that of the bus 2, while the bus 1 is separated from the bus 2 and has a 0 KHz operating clock rate.

Similarly, when one of the slave devices A and B that are coupled electrically to the bus 0 sends the request signal, the CPU 22, after determining where the request signal comes from, sets the bus controller 21 to adjust the operating clock rate of the bus 0 according to the working clock rate (or the highest working clock rate) of said one of the slave devices A and B, and to control the bus selector unit 28 be inactive such that the operating clock rates of the buses 1 and 2 are 0 KHz, and the buses 1 and 2 are completely separated from the bus 0 for power saving purposes.

In summary, the aforementioned embodiments, by means of the CPU 22 determining the slave device to be accessed by the bus controller 21 so as to obtain the working clock rate thereof, and setting the bus controller 21 according to the working clock rate thus obtained for dynamically adjusting the operating clock rate of the bus, may access the slower slave device at a relatively lower speed to save power, and may access the faster slave device at a relatively higher speed for promoting system efficiency.

While the present invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A dynamic bus clock rate adjusting method to be executed by a bus controller and a central processing unit (CPU) that are electrically coupled together, the bus controller being further coupled electrically with a bus that is coupled electrically with a plurality of slave devices, and being able to control an operating clock rate of the bus, the method comprising the steps of:
   configuring the bus controller to generate, upon receipt of a request signal from one of the slave devices and according to the request signal, an access instruction including an address from which the request signal is sent; and
   configuring the CPU to determine, according to the access instruction, which of the slave devices the address of the access instruction corresponds so as to obtain a working clock rate thereof, and to set the bus controller according to the working clock rate thus obtained for the bus controller to adjust the operating clock rate of the bus according to the working clock rate, and to perform the access instruction on the slave device via the bus.

2. The dynamic bus clock rate adjusting method as claimed in claim 1, wherein the working clock rate is a highest working clock rate of the slave device, and the bus controller is set to adjust the operating clock rate of the bus to be equal to the working clock rate of the slave device.

3. The dynamic bus clock rate adjusting method as claimed in claim 1, wherein the bus is one of:
   a System Management Bus (SMBus), where the bus controller is an SMBus controller;
   an Inter-Integrated Circuit (I2C) bus, where the bus controller is an I2C bus controller; and
   a Serial Peripheral Interface (SPI) bus, where the bus controller is an SPI bus controller.

4. The dynamic bus clock rate adjusting method as claimed in claim 1, wherein the request signal is an interrupt signal.

5. The dynamic bus clock rate adjusting method as claimed in claim 1, wherein the CPU is configured to determine which of the slave devices the address of the access instruction corresponds, to obtain the working clock rate of the slave device, and to set the bus controller according to the working clock rate thus obtained by means of executing a device driver associated with the bus controller.

6. The dynamic bus clock rate adjusting method as claimed in claim 1, the bus controller being further coupled electrically with a bus selector unit, which has an input terminal that is coupled electrically to the bus, and at least two output terminals that are coupled electrically and respectively to two other buses, each of the two other buses being coupled electrically with at least one slave device capable of transmitting a request signal to the bus controller through the bus selector unit, the bus selector unit being operable to selectively establish electrical connection between the input terminal and one of the at least two output terminals, wherein:
   when it is determined by the CPU that the slave device the address of the access instruction corresponds is one coupled electrically to one of the two other buses, the CPU is configured to set the bus controller such that the bus controller controls the bus selector unit to establish electrical connection between the input terminal and one of the at least two output terminals to which said one of the two other buses is electrically coupled, adjusts the operating clock rate of said one of the two other buses according to the working clock rate obtained by the CPU, and performs the access instruction on the slave device via said one of the two other buses.

7. The dynamic bus clock rate adjusting method as claimed in claim 6, wherein the CPU is configured to determine which of the slave devices the address of the access instruction corresponds, to obtain the working clock rate of the slave device, and to set the bus controller according to the working clock rate thus obtained by means of executing a device driver associated with the bus controller.

8. A dynamic bus clock rate adjusting device comprising:
   a bus controller being adapted to be coupled electrically with a bus that is coupled electrically with a plurality of slave devices, and being able to control an operating clock rate of the bus, said bus controller being configured to generate, upon receipt of a request signal from one of the slave devices and according to the request signal, an access instruction including an address from which the request signal is sent; and
   a central processing unit (CPU) being electrically coupled to said bus controller, said CPU being configured to determine, according to the access instruction, which of the slave devices the address of the access instruction corresponds so as to obtain a working clock rate thereof, and to set said bus controller according to the working clock rate thus obtained for said bus controller to adjust the operating clock rate of the bus according to the working clock rate, and to perform the access instruction on the slave device via the bus.

9. The dynamic bus clock rate adjusting device as claimed in claim 8, wherein the working clock rate is a highest working clock rate of the slave device, and said bus controller is set to adjust the operating clock rate of the bus to be equal to the working clock rate of the slave device.

10. The dynamic bus clock rate adjusting device as claimed in claim 8, wherein said bus controller is one of:
    a System Management Bus (SMBus) controller, where the bus is an SMBus controller;
    an Inter-Integrated Circuit (I2C) bus controller, where the bus is an I2C bus; and
    a Serial Peripheral Interface (SPI) bus controller, where the bus is an SPI bus controller.

11. The dynamic bus clock rate adjusting device as claimed in claim 8, wherein the request signal is an interrupt signal.

12. The dynamic bus clock rate adjusting device as claimed in claim 8, wherein said CPU is configured to determine which of the slave devices the address of the access instruction corresponds, to obtain the working clock rate of the slave device, and to set said bus controller according to the working clock rate thus obtained by means of executing a device driver associated with said bus controller.

13. The dynamic bus clock rate adjusting device as claimed in claim 8, further comprising a bus selector unit coupled electrically with said bus controller, said bus selector unit having an input terminal that is to be coupled electrically to the bus, and at least two output terminals that are to be coupled electrically and respectively to two other buses, each of the two other buses being coupled electrically with at least one slave device capable of transmitting a request signal to said bus controller through said bus selector unit, said bus selector unit being operable to selectively establish electrical connection between said input terminal and one of said at least two output terminals, wherein:
   when it is determined by said CPU that the slave device the address of the access instruction corresponds is one coupled electrically to one of the two other buses, said CPU is configured to set said bus controller such that said bus controller controls said bus selector unit to establish electrical connection between said input terminal and one of said at least two output terminals to which said one of the two other buses is electrically coupled, adjusts the operating clock rate of said one of the two other buses according to the working clock rate obtained by said CPU, and performs the access instruction on the slave device via said one of the two other buses.

14. The dynamic bus clock rate adjusting device as claimed in claim 13, wherein said CPU is configured to determine which of the slave devices the address of the access instruction corresponds, to obtain the working clock rate of the slave device, and to set said bus controller according to the working clock rate thus obtained by means of executing a device driver associated with said bus controller.

* * * * *